Jan. 3, 1939.  R. A. FONTAINE  2,142,748
TRUCK AND TRAILER CONNECTION
Filed June 30, 1936  2 Sheets-Sheet 1
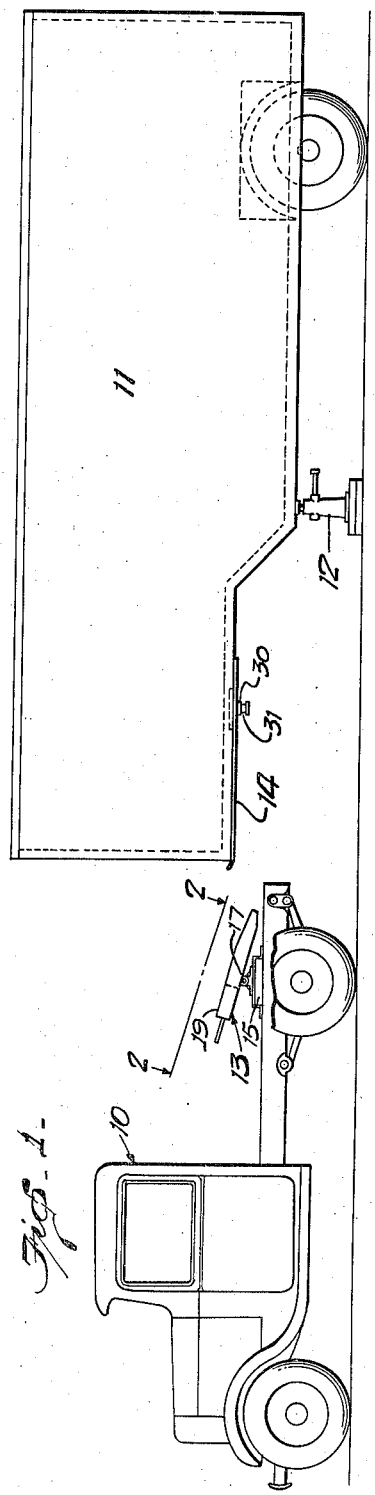
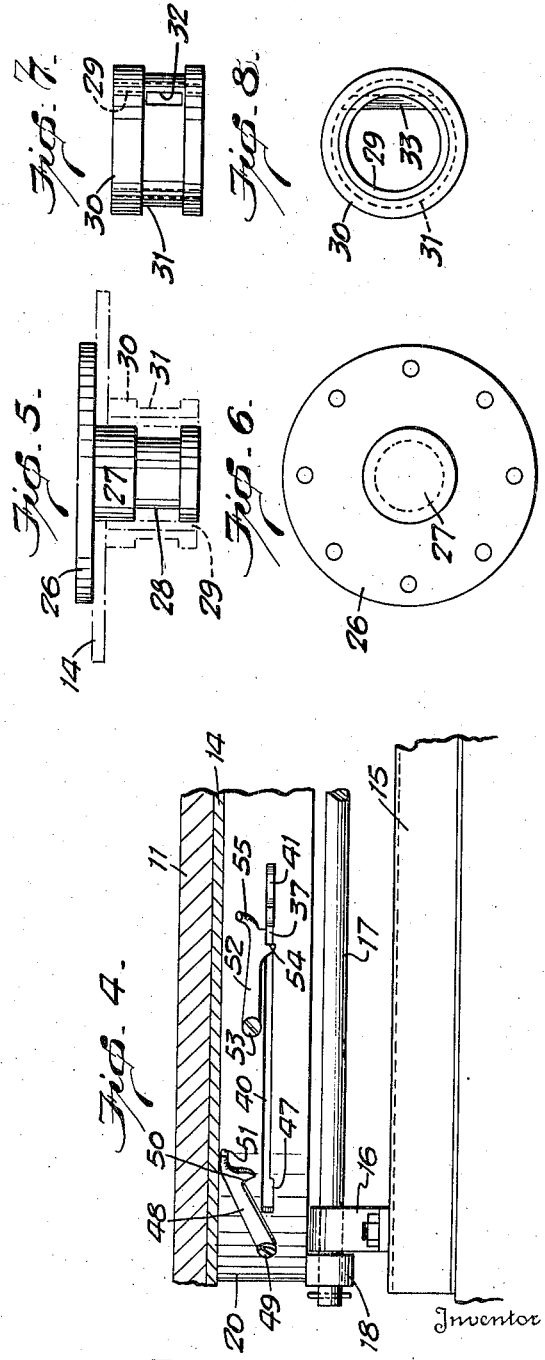
Inventor
Robert A. Fontaine
By Ernest S. Mechlin
Attorney Jan. 3, 1939.　　　R. A. FONTAINE　　　2,142,748
TRUCK AND TRAILER CONNECTION
Filed June 30, 1936　　　2 Sheets-Sheet 2
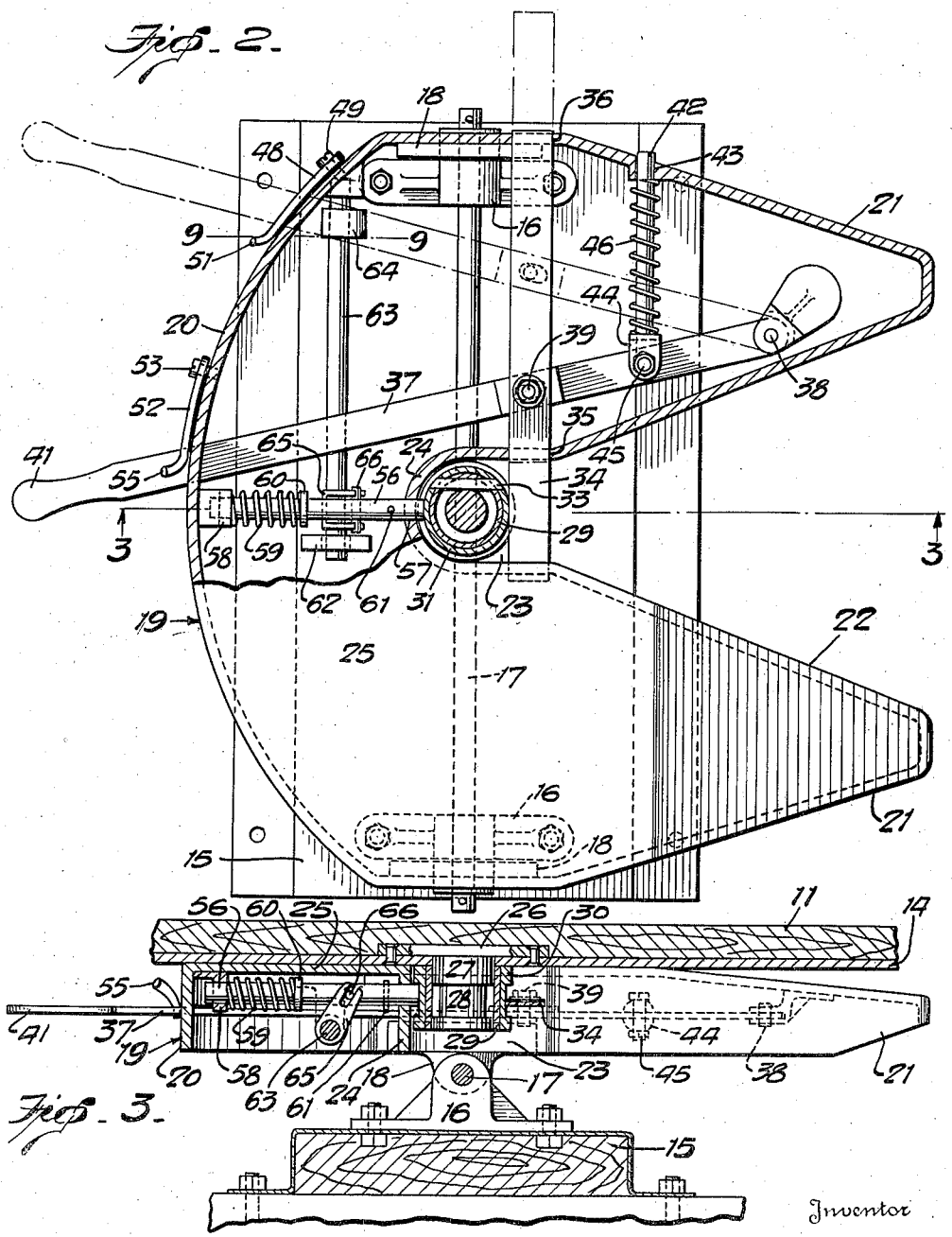
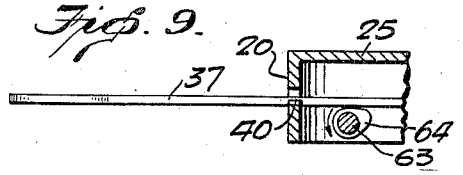

Patented Jan. 3, 1939

2,142,748

UNITED STATES PATENT OFFICE 2,142,748

TRUCK AND TRAILER CONNECTION

Robert A. Fontaine, Martinsville, Va.

Application June 30, 1936, Serial No. 88,219

5 Claims. (Cl. 280—33.1)

The invention relates to that type of mechanism or vehicle in which a power unit such as a truck or tractor may be detachably connected with the vehicle body so that the power unit may be continued in use while the detachable body is being loaded or unloaded.

In the connection between such a power unit and detachable body there is necessarily a king pin which must fit sufficiently loosely to permit turning movement of the entire vehicle and it has been found that it is at this point that, in ordinary constructions, excessive wear occurs resulting in undue slackness causing a lash which intensifies wear and may cause serious damage to the part.

It is with the above facts in view that the present invention has been devised, the principal object of which is to provide a power unit and trailer or body connection or so-called fifth wheel embodying a novel king pin and bearing structure which will reduce wear to the minimum so that slackness will not occur, the specific construction being moreover, such that in the event it should develop as is practically inevitable after a prolonged time of service, replacement of the worn part may be readily effected without disturbing the entire mechanism.

An important object of the invention is to provide a truck and trailer connection or so-called fifth wheel of that type in which the fifth wheel is rockably mounted on the power unit and so constructed as to guidably receive the king pin device which is locked in place upon relative movement of the power unit and body or trailer longitudinally with respect to each other.

A more specific object is to provide a novel trigger operated locking mechanism which is automatically actuated to lock the king pin in place for securely connecting the power unit and body or trailer when the king pin reaches the forward end of the socket provided for its reception, the arrangement being such that release of the king pin is brought about by a simple lever movement.

Another specific object is to provide a fifth wheel connection so mounted that it will gravitationally remain normally in a position most favorable to guidably receive the king pin.

Another object is to provide manually operable safety latches for holding the lever of the locking device in either selected position depending upon circumstances so that there will be no accidental locking or unlocking action.

An additional object is to provide a structure which will be simple, comparatively inexpensive in manufacture and installation, positive in action, efficient and durable in service, and a general improvement in the art.

To the attainment of the foregoing and other objects and advantages, the invention preferably consists in the arrangement and combination of parts to be hereinafter more fully described and claimed, and illustrated in the accompanying drawings in which:

Figure 1 is a somewhat diagrammatic side elevation of a truck or power unit and a detachable body or trailer, the two elements being shown as disconnected.

Figure 2 is a greatly enlarged view taken on the line 2—2 of Figure 1 with parts broken away and in section to show the fifth wheel structure in detail.

Figure 3 is a central vertical cross sectional view through the fifth wheel structure taken on the line 3—3 of Figure 2.

Figure 4 is a fragmentary view of the forward portion of the fifth wheel structure and illustrating the manually operable latches for the movable lever.

Figure 5 is a detail side elevation of the king pin with its surrounding sleeve shown by dot and dash lines.

Figure 6 is a bottom plan view of what is shown in Figure 5.

Figure 7 is a side elevation of the sleeve surrounding the king pin.

Figure 8 is a plan view thereof.

Figure 9 is a fragmentary detail section taken on the line 9—9 of Figure 2.

Referring more particularly to the drawings, the numeral 10 designates a power unit such as a truck or tractor while 11 represents the detachable trailer or body. Devices of this general type are in common use and possess the advantage that a single power unit can take care of a number of trailers or bodies, the latter being left propped up by some suitable support such, for instance, as a jack 12 so that the power unit may be readily hooked onto or detached from the trailer or body.

Carried by the power unit 10 is the fifth wheel structure, indicated as a whole at 13, which constitutes the subject matter of the present invention and which is adapted for disposition beneath the forward end of the body 11 which is shod on its underside with a wear plate 14.

The mounting for the fifth wheel comprises an elongated supporting member 15 secured transversely of the power unit frame and equipped with upstanding brackets 16 through which extend a transverse rod or shaft 17 which constitutes a bearing for brackets 18 appropriately secured on the underside of the fifth wheel proper which is disclosed as consisting of a metallic member such as a casting 19 having a curved forward wall 20 and V-shaped elongated rear portions 21 which define between them a V-shaped guide opening 22 leading to a socket 23 adapted to receive rotatably the king pin carried by the trailer or body 11. The forward wall 24 of the socket 23 is semi-cylindrical while the side walls are parallel throughout a portion of their length and merge into the confronting walls of the opening 22 which constitutes the guide. The fifth wheel has a top wall 25 which houses the mechanism to be described.

A feature of tremendous importance is the construction of the king pin which is shown as comprising a disk 26 secured to the trailer or body 11 and located above the wear plate 14, this disk having depending therefrom a trunnion member 27 peripherally grooved at 28 and carrying a bushing 29 which fits closely and which is in turn surrounded by an outer sleeve 30 peripherally grooved at 31. The bushing 29 and sleeve 30 are formed with alined slots 32 for the passage of a key 33 which is substantially tangential to the grooved portion 28 of the trunnion member 27 and which is for the purpose of locking the sleeve and bushing against relative rotation while permitting their rotation as an assembly with respect to the trunnion member 27, the idea being that any unavoidable wear will be taken by the bushing 29 which may, of course, be readily replaced when necessary.

The means for locking the king pin assembly within the socket 23 comprises a longitudinally slidable lock bar 34 guidably movable within slots 35 in the confronting walls of the openings 22 and through a slot 36 in one side wall of the fifth wheel 19. This lock bar is designed to engage behind the king pin assembly and, when in locking position, is located within the groove 31 in the sleeve 30. The operating means for the locking bar comprises an elongated lever 37 pivoted at 38 within one of the elongated rear portions 21 of the fifth wheel. This lever is pivotally and slidably connected at 39 with the lock bar and is of sufficient length to extend through a slot 40 in the curved forward wall 20 of the fifth wheel, the projecting end constituting a handle 41. The means for urging the lock bar into its king pin engaging position consists of a rod 42 slidable through a slot 43 in one side wall of the fifth wheel and having its other end terminating in a clevis 44 pivoted at 45 to the lever 37, the rod being surrounded by a spring 46 which abuts against the clevis and against the side wall of the fifth wheel for urging the lever 37 and consequently the lock bar 34 toward the king pin.

In order that the lock bar may be held in retracted or released position with respect to the king pin one end of the slot 40 is formed at its lower edge with a notch 47 within which the lever is engaged when in releasing position as shown by dot and dash lines in Figure 2. To prevent accidental movement of the lever out of this notch there is provided a safety latch 48 pivoted at 49 on the outer face of the curved front wall 20 of the fifth wheel and having a retaining shoulder 50 engageable with the inner edge of the lever. The latch terminates in a finger piece or hand-hold 51 by means of which it may be swung upwardly out of engagement with the lever. Similarly, means is provided for positively holding the lever to maintain the lock bar 34 in its king pin engaging position and this means consists of a latch 52 pivoted at 53 in the forward curved wall 20 of the fifth wheel and having a shoulder 54 engageable with the outer edge of the lever for preventing movement thereof. This latch terminates in a finger piece or handhold 55 by means of which it may be swung upwardly to release the lever so that it may be swung outwardly from the full line position to the dot and dash line position shown in Figure 2 for thereby retracting the lock bar 34.

It is intended that under normal conditions the locking mechanism should be in released position with the lever 37 in the dot and dash line position shown in Figure 2, and that locking of the king pin to the fifth wheel should be accomplished automatically when the power unit 10 is backed up to the body or trailer 11 so as to bring the king pin into the socket 23. To bring this about, there is provided a plunger 56 located at the longitudinal center line of the fifth wheel and mounted for longitudinal movement, the wall 24 of the socket having a hole 57 and an apertured bracket 58 being provided for guide purposes to permit this movement. This plunger is urged in projected relation into the socket 23 by means of a suitable spring 59 which abuts against the bracket 58 and against a collar 60 on the plunger, the degree of projection of the plunger into the socket 23 being limited by a pin 61. Extending transversely within the fifth wheel and rotatably mounted within suitable bearings 62 is a shaft 63 equipped near one end with a cam 64 located beneath the position occupied by the lever 37 when the lever is in its releasing position. Near its other end the shaft 63 carries a fork 65 with bifurcated arms receiving a transverse element 66 extending through the plunger 56.

The operation of the entire mechanism is as follows: Assuming that the power unit 10 is disconnected from the body or trailer 11 and that the lever 37 is in the dot and dash line position shown in Figure 2 and engaged within the notch 47 and retained therein by the shoulder 50 on the latch 48, when it is desired to couple the power unit to the trailer, it is first necessary to swing the latch 48 upwardly to disengage the shoulder 50 from the lever 37. The power unit is then backed up to the trailer so that the king pin on the latter will enter the guide opening 22 and pass into the socket 23. When the king pin assembly strikes against the end of the plunger 56, which at this time projects into the socket 23, the plunger will be moved longitudinally against the resistance of the spring 59. When this occurs the engagement of the element 66 within the bifurcated arms of the fork 65 will cause partial rotation of the shaft 63 whereupon the cam 64 carried thereby and engaging beneath the lever 37 will move the lever upwardly out of the notch 47. When this occurs the spring 46 surrounding the rod 42 and reacting against the lever will cause the lever to move along the slot 40 inwardly or toward the center line of the fifth wheel, or in other words into the position shown by full lines in Figure 2. As the lever is thus moved it carries with it the lock bar 34 which is thus projected across the entrance to the socket 23 into engagement within the groove 31 in the periphery of the sleeve 30. If desired the latch 52 may be swung down to bring the shoulder 54 behind the lever to prevent it from being moved into releasing position. The king pin assembly is then of course positively connected to the fifth wheel. The connection and the construction at this point are clearly such that free movement of the king pin assembly with respect to the fifth wheel is assured while at the same time any undue play is prevented so that lash and consequent wear will be entirely avoided. If in the fullness of time there should be any wear it can be taken up by replacing the bushing 29, which is a simple and inexpensive matter.

To release the power unit from the trailer it is merely necessary to swing the latch 52 upwardly to disengage the lever 37 whereupon the lever is to be swung manually outwardly or toward the side of the fifth wheel and engaged within the notch 47 after which the latch 48 should be moved downwardly to engage the shoulder 50 with the lever and thus prevent movement of the latter.

From the foregoing description and a study of the drawings it will be apparent that there has thus been provided a simply constructed, inexpensive and easily installed connection for a power unit and trailer or body possessing the great advantage of ease of movement without binding and without any appreciable wear. Another convenient and advantageous characteristic is the provision of the trigger mechanism for automatically effecting locking of the king pin into place. If desired for the sake of cheapness it is of course conceivable that this trigger device might be omitted and that manual operation be relied upon entirely to effect locking as well as unlocking but, as mentioned above, the automatic feature is highly desirable and valuable.

While there has been shown the preferred embodiment of the invention, it should be understood that this is merely an exemplification of the principles involved and that the right is reserved to make all such changes as will not depart from the salient features of the invention or the scope of the claims hereunto appended.

Having thus described the invention, what is claimed is:

1. Connecting means for a power unit and a trailer body, comprising a king pin depending from the trailer body, a fifth wheel mounted on the power unit and having a socket with a flaring entrance for the reception of said king pin, a lock bar slidably mounted in said fifth wheel and adapted to traverse said socket rearwardly of said king pin for maintaining the king pin in position, a spring pressed lever pivoted within the fifth wheel and connected with said lock bar for normally urging the same into said socket traversing position, means initially maintaining said lever in position with said lock bar retracted, and means operable upon entry of the king pin within the socket to release said maintaining means, said last named means comprising a cam mechanism engageable by the king pin and engageable with said lever when the lever is in bolt withholding position.

2. Connecting means for a power unit and a trailer body, comprising a king pin depending from the trailer body, a fifth wheel mounted upon the power unit and having a socket with a flaring entrance for the reception of the king pin, a lock bar slidably mounted in the fifth wheel, a lever pivoted within the fifth wheel and operatively connected with said lock bar, spring means normally urging the lock bar into position traversing the socket for retaining the king pin therein, means for initially holding the lever in position with the lock bar retracted from the socket, a spring pressed plunger entering the socket and movable upon entry of the king pin thereinto, and cam means operated by movement of said plunger to disengage the lever from the holding means to enable the lock bar to move into position traversing the socket.

3. Means for connecting a power unit with a trailer body, comprising a king pin depending from the latter, a fifth wheel mounted on the former and having a socket with a flaring entrance adapted to receive the king pin, a lock bar slidable transversely of the fifth wheel adapted to traverse the socket rearwardly of the king pin for retaining the king pin therewithin, a lever pivoted at one end within the fifth wheel and having its other end projecting therebeyond to serve as a handle for manual operation, said lever having a pivotal and slidable connection with the lock bar, said lever being movable in one direction or the opposite to control the position of the lock bar with respect to the socket whereby the lock bar may be selectively retained in operative position or released from engagement with the king pin, keeper means on the fifth wheel cooperating with said lever for maintaining said lock bar in non-obstructing relation to said socket, and means including a cam adapted to be contacted by said king pin upon entry thereof within said socket for moving said lever out of engagement with said keeper means whereby it may move to bring the lock bar into obstructing relation to the socket.

4. Means for connecting a power unit with a trailer body, comprising a king pin depending from the latter, a fifth wheel mounted on the former and having a socket with a flaring entrance adapted to receive the king pin, a lock bar slidable transversely of the fifth wheel adapted to traverse the socket rearwardly of the king pin for retaining the king pin therewithin, a lever pivoted at one end within the fifth wheel and having its other end projecting therebeyond to serve as a handle for manual operation, said lever having a pivotal and slidable connection with the lock bar, said lever being movable in one direction or the opposite to control the position of the lock bar with respect to the socket whereby the lock bar may be selectively retained in operative position or released from engagement with the king pin, keeper means on the fifth wheel cooperating with said lever for initially maintaining said lock bar in non-obstructing relation to said socket, a rock shaft journaled in the fifth wheel and carrying a cam, and a spring pressed plunger projecting into the socket and operatively connected with said rock shaft for moving said cam to disengage the lever from the keeper means upon entry of the king pin within the socket.

5. The combination with a trailer body having a depending king pin, a power unit, a fifth wheel mounted on said power unit and having a guide opening at its rear end leading into a socket for the reception of said king pin, locking means carried by said fifth wheel for securing the king pin within the socket, lever means pivotally connected to said locking means, retaining means for said lever when said locking means is in inactive position, means adapted to contact said lever means and engageable by the king pin upon the entrance thereof within said socket constructed and arranged to disengage said lever from said retaining means and allow said locking means to assume its king pin engaging position.

ROBERT A. FONTAINE.